United States Patent [19]

Martin

[11] Patent Number: 4,499,362

[45] Date of Patent: Feb. 12, 1985

[54] ROTARY BEAM CHOPPER WITH CONTINUOUSLY VARIABLE DUTY CYCLE

[75] Inventor: Peter Martin, Richmond, Va.

[73] Assignee: Philip Morris Incorporated, New York, N.Y.

[21] Appl. No.: 509,160

[22] Filed: Jun. 29, 1983

[51] Int. Cl.³ .............................................. B23K 27/00
[52] U.S. Cl. .................... 219/121 LA; 219/121 LK; 219/121 LQ; 219/121 LR; 219/121 LT; 350/274
[58] Field of Search ................. 219/121 LK, 121 LL, 219/121 LP, 121 LQ, 121 LR, 121 LS, 121 LT, 121 LU, 121 LV; 350/273, 274; 131/281

[56] References Cited

U.S. PATENT DOCUMENTS

2,589,414  3/1952  Martin et al. ........................ 356/434
3,942,878  3/1976  Engel et al. ................. 219/121 FS X
4,118,619  10/1978  McArthur et al. .......... 219/121 LK Primary Examiner—C. L. Albritton
Attorney, Agent, or Firm—Thomas L. Giannetti; Jeffrey H. Ingerman

[57] ABSTRACT

Apparatus for converting a continuous incident laser beam into a pulsed laser beam, with a duty cycle of pulsation that is substantially continuously variable between a minimum value and a maximium value, is disclosed. The apparatus uses a rotatable disc of non-transmissive material which has a plurality of apertures and adjacent nontransmissive portions disposed in an annular zone. The ratio of the width of each aperture to the width of the adjacent nontransmissive portion substantially continuously varies radially from a minimum ratio to a maximum ratio. As the disc is rotated, the beam is alternately transmitted and blocked, so that a pulsed output beam emerges. The duty cycle of the beam can be adjusted by radially varying the point of incidence of the incident beam within the annular zone so that it impinges on the zone at a radius at which the ratio of widths is at a desired value. Such apparatus can be used in a system for perforating a web of sheet material with a pulsed laser beam.

12 Claims, 10 Drawing Figures

ROTARY BEAM CHOPPER WITH CONTINUOUSLY VARIABLE DUTY CYCLE

BACKGROUND OF THE INVENTION

This invention relates to apparatus for converting a continuous laser beam into one or more pulsed laser beams in which the duty cycle can be set at any one of an infinite number of values between a minimum and a maximum value. More particularly, this invention relates to a system for modifying a continuous laser beam and directing it in the form of one or more pulsed beams, in which the duty cycle can be varied, at a moving paper web for the purpose of perforating rows of holes in the web.

In the manufacture of cigarettes, for example, it is a common practice to perforate the cigarette paper or tipping paper in rows, for the purpose of providing smoke dilution. Before the laser became available, the perforations were made by mechanical means or with electrical spark perforators. With the advent of the laser, it became possible to achieve greater precision and speed than had previously been possible.

In creating a row of perforations using a laser, it is usually the practice to move the paper web while pulsing the laser beam. The maximum speed of the process is thus governed by the frequency at which the beam can be pulsed and the speed at which the web can be moved. With currently available laser equipment, the internal pulsation frequency of the laser is a limiting factor. Because of this, other means, external to the laser, for interrupting a continuous beam have been sought.

In addition, it is frequently desired to perforate the web at more than one location at a time. For example, it may be preferable to have two or more parallel rows of perforations. However, because of the increased capital and operating expenses and space limitations, it is not desirable to use more than one laser to achieve such perforations.

One type of system that has been developed to meet these needs uses mechanical rotary shutters or "beam choppers," to periodically interrupt a beam at a desired pulsation frequency. Portions of the shutters may be made reflective in order to direct the pulsed beam to several different targets sequentially, utilizing some of the energy that would otherwise be wasted in the "off" portion of the cycle. An example of this type of system is shown in U.S. Pat. No. 4,118,619, which discloses a plurality of coaxial discs provided with a predetermined pattern of apertures, reflective portions, and opaque portions.

Such systems do not permit of much adjustment once assembled. The pulsation characterisics of the output beam can be changed only to the extent that they are affected by changes in the rotational speed of the disc. The higher the rotational speed becomes, the greater becomes the pulsation frequency and the shorter becomes the pulse duration, or "on" time. It is not possible to adjust the pulsation frequency without at the same time changing the pulse duration. In any case, the duty cycle, or ratio of "on" time of the beam to the total of "on" plus "off" time, would remain constant. To adjust one of these characteristics without affecting the others in the system of U.S. Pat. No. 4,118,619, for example, would require disassembling the system and re-assembling it with a new set of discs.

The capacity to make such adjustments more easily is desirable because equipment with such capabilities could be used for producing more than one type of product, without the need for reassembly of the equipment during the change-over between products. For example, it may be necessary to produce holes of different sizes for different types of cigarettes. For others, it may be necessary to place the perforations closer together or farther apart.

SUMMARY OF THE INVENTION

It is an object of this invention, therefore, to provide a mechanical rotary shutter system for interrupting a continuous laser beam, wherein the duty cycle may be substantially continuously varied between a minimum value and a maximum value.

It is a further object of this invention to provide a flexible and reliable laser perforation system for sheet material, particularly cigarette paper.

Still another object of this invention is to provide such a system with a minimum of moving parts and a minimum of complexity.

In accordance with the present invention there is provided apparatus for converting a continuous incident laser beam into a pulsed output beam, with the duty cycle of the beam substantially continuously variable between minimum and maximum values. The apparatus comprises a rotatable chopper wheel or disc of nontransmissive material having apertures disposed in an annular zone. The ratio of the width of the apertures to the width of the adjacent nontransmissive disc portions between them varies substantially continuously with disc radius from a minimum ratio to a maximum ratio. The beam impinges on the disc in the area of the apertures and, as the disc is rotated with means provided therefor, it is alternately transmitted by the apertures and blocked by the nontransmissive portions, creating a pulsed output beam.

Means are provided for radially varying the point of incidence of the beam on the disc, such that a desired duty cycle can be selected by causing the beam to impinge on the disc at a radius at which the width of the apertures and of the nontransmissive portions therebetween are at the desired ratio.

DESCRIPTION OF THE PREFERRED EMBODIMENTS

Figure 1:
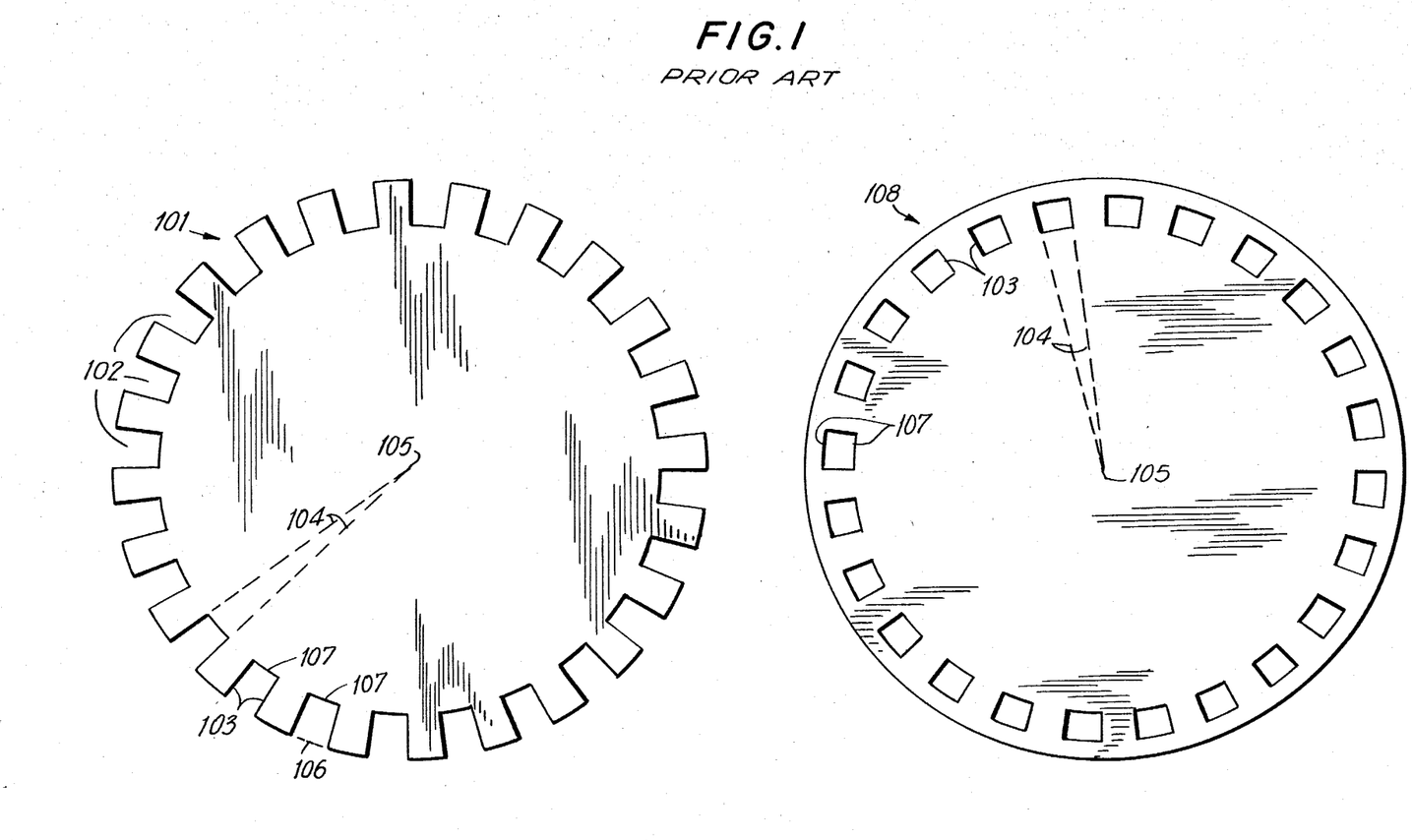
FIG. 1 is a front elevational view of chopper discs of the prior art.

The preferred embodiments of the present invention can best be understood after a general consideration of the operating principles of the prior art and the invention. As shown in FIG. 1, chopper discs of the prior art generally have apertures bounded by two line segments which are segments of radii of the disc, or are substantially parallel to radii of the disc. In prior art disc 101, the apertures 102 are gaps in the edge of the disc. These gaps are bounded by segments 103, and two arc segments. As shown by dashed lines 104, segments 103 are segments of lines which intersect at center 105 of the disc. Arc segment 106 is the imaginary continuation of the periphery of the disc, while arc segment 107 is an arc segment of a circle concentric with the disc periphery, but of a smaller radius. In prior art disc 108, the apertures are inward of the edge of the disc, bounded by radial segments 103 and two arc segments 107.

In prior art discs such as disc 101 and disc 108, the ratio of the width of the open, transmissive areas to that of the adjacent closed, nontransmissive areas is substantially constant, regardless of the distance from the center of the disc. Therefore while radially varying the point of incidence of a laser beam within the annular zone will change the duration of transmission, it will also change the duration of nontransmission by proportionally the same amount, so that the duty cycle, or ratio of "on" time to the total of "on" plus "off" time in the pulsed output beam, will not change. Similarly, variation of the speed at which the disc rotates will change the frequency of pulsation, as well as the duration of each pulse and the gaps therebetween, but will not change the duty cycle.

By contrast, in discs of the present invention, the width of the transmissive areas varies inversely as the width of the nontransmissive areas as the point of incidence varies radially. As the transmissive areas widen, the nontransmissive areas narrow. Therefore, radial variation of the point of incidence will vary the duty cycle of the pulsed output beam.

Figure 2:
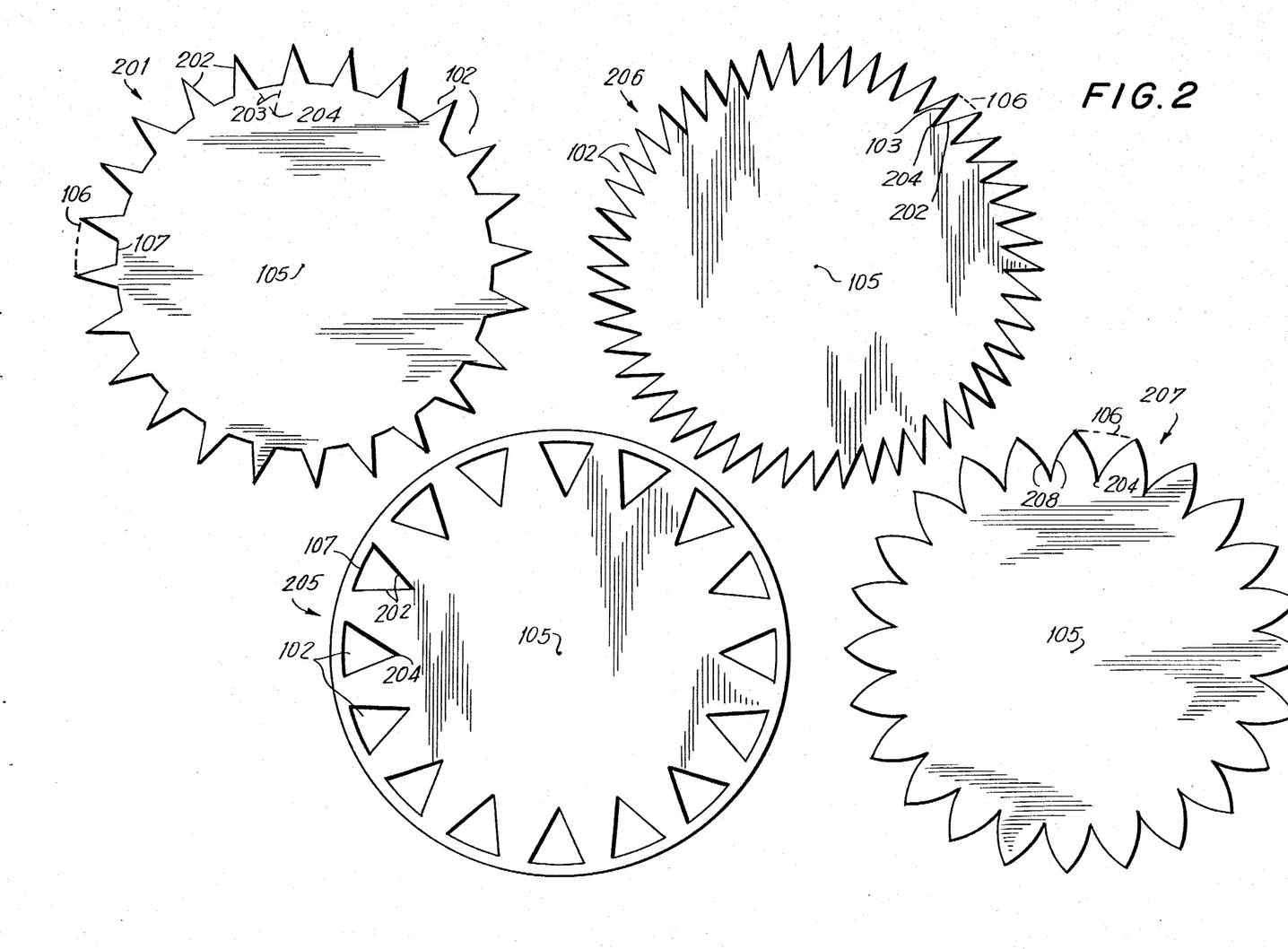
FIG. 2 is a front elevational view of chopper discs according to the present invention.

Typical chopper discs of the present invention, such as disc 201 of FIG. 2, have apertures 102 bounded by segments 202, which, as shown by dashed lines 203, are non-radial, intersecting at point 204 rather than at center 105. The apertures are also bounded, again, by arc segments 106 and 107. In disc 205, apertures 102 are bounded on only three sides. These apertures, inward of the periphery of the disc, are bounded by arc segment 107 and line segments 202, with the intersection 204 of the lines of which segments 202 are parts occurring at the radially inwardmost point of the aperture. In disc 206, which is the most preferred form of disc according to the present invention for reasons to be discussed below, apertures 102 are bounded by imaginary arc segment 106, radial segment 103 and non-radial segment 202. As in discs 201 and 205, the lines of which the two segments are parts intersect at point 204, and as in disc 205, point 204 is at the radially inwardmost point of the aperture.

Further, the present invention is not limited to discs in which the apertures are bounded by line segments. Discs such as disc 207, in which the apertures are bounded by nonlinear curves 208, are within the scope of the invention as long as the width of the transmissive areas varies inversely as the width of the nontransmissive areas as the point of incidence varies radially. Similarly, it is not necessary that the apertures be bounded by smooth curves. Discs with apertures whose widths vary in small steps (i.e., less than the width of the beam) are also within the scope of the invention.

Figure 3:
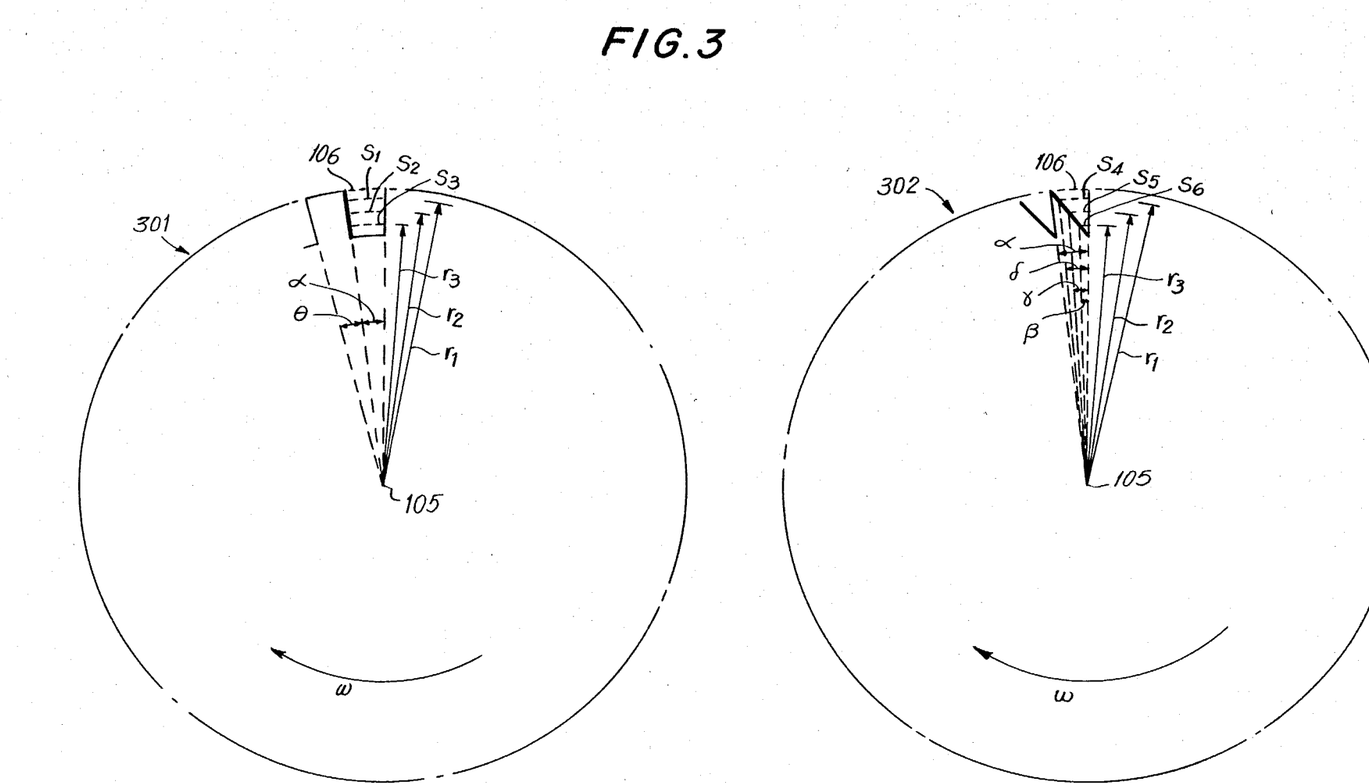
FIG. 3 is a geometric diagram illustrating the operation of the present invention.

The difference between the operation of the prior art discs and the operation of the discs of the present invention is illustrated geometrically in FIG. 3, where 301 is a geometric representation of a prior art disc and 302 is a geometric representation of a disc according to the present invention. Both discs are rotating about their respective centers 105 at a rotational speed $\omega$. Three arc segments, $s_1$, $s_2$, and $s_3$, represent the paths that would be taken across an aperture subtending an angle $\alpha$ in disc 301 by a laser beam impinging on that disc at radii of $r_1$, $r_2$ and $r_3$ respectively. The respective path lengths are:

$$s_1 = r_1\alpha \qquad s_2 = r_2\alpha \qquad s_3 = r_3\alpha$$

The duration of the respective pulses is equal to the quotient of the path length and the path velocity. The respective path velocities are as follows:

$$\dot{s}_1 = r_1\dot{\alpha} \qquad \dot{s}_2 = r_2\dot{\alpha} \qquad \dot{s}_3 = r_3\dot{\alpha}$$
$$= r_1\omega \qquad = r_2\omega \qquad = r_3\omega$$

Therefore, the respective pulse durations are:

$$\Delta t_1 = \frac{r_1\alpha}{r_1\omega} \qquad \Delta t_2 = \frac{r_2\alpha}{r_2\omega} \qquad \Delta t_3 = \frac{r_3\alpha}{r_3\omega}$$
$$= \alpha/\omega \qquad = \alpha/\omega \qquad = \alpha/\omega$$

As explained above, all three pulse durations are the same.

The three arc segments $s_4$, $s_5$ and $s_6$, represent the paths that would be taken across an aperture in disc 302 at the same radii, $r_1$, $r_2$ and $r_3$, respectively. (The angle subtended by imaginary arc segment 106 is the same as that subtended by imaginary arc segment 106 of disc 301, or $\alpha$.) For these paths:

$$s_4 = r_1\delta \qquad s_5 = r_2\gamma \qquad s_6 = r_3\beta$$
$$\dot{s}_4 = r_1\omega \qquad \dot{s}_5 = r_2\omega \qquad \dot{s}_6 = r_3\omega$$
$$\Delta t_4 = \delta/\omega \qquad \Delta t_5 = \gamma/\omega \qquad \Delta t_6 = \beta/\omega$$

For disc 301, the nontransmissive portion adjacent to each aperture subtends an angle $\theta$. The "off" duration for all three paths would be, by analogy to the "on" durations, $\Delta t_{off} = \theta/\omega$. The duty cycle, then, would be $\Delta t/(\Delta t + \Delta t_{off}) = \alpha/(\alpha + \theta)$. For disc 302, the "off" durations would be:

$$\Delta t_{off4} = (\alpha - \delta)/\omega \quad \Delta t_{off5} = (\alpha - \gamma)/\omega$$
$$\Delta t_{off6} = (\alpha - \beta)/\omega,$$

and the corresponding duty cycles would be:

$$\Delta t_4/(\Delta t_4 + \Delta t_{off4}) = \delta/\alpha \quad \Delta t_5/(\Delta t_5 + \Delta t_{off5}) = \gamma/\alpha$$
$$\Delta t_6/(\Delta t_6 + \Delta t_{off6}) = \beta/\alpha$$

Figure 4:
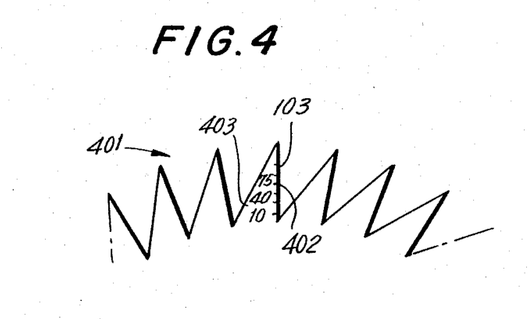
FIG. 4 is an enlarged view of part of one of the discs of FIG. 2 showing pulse duration indicia.

These values might be marked, in practice, on the nontransmissive portions of a disc, as indicated in FIG. 4. There, an enlarged portion 401 of disc 206 of FIG. 2 is shown with exemplary indicia 402 marked on radial edge 103 of nontransmissive portion 403. In this example, the indicia shown represent the duty cycle value expressed as a percentage. By illuminating these indicia with the laser beam during duty cycle adjustments, it is easy to adjust to a desired value. It is because of the availability of the radial edge as a location for these indicia that disc 206 is the most preferred form of disc according to the invention. However, the indicia can be used on any form of disc.

Figure 5:
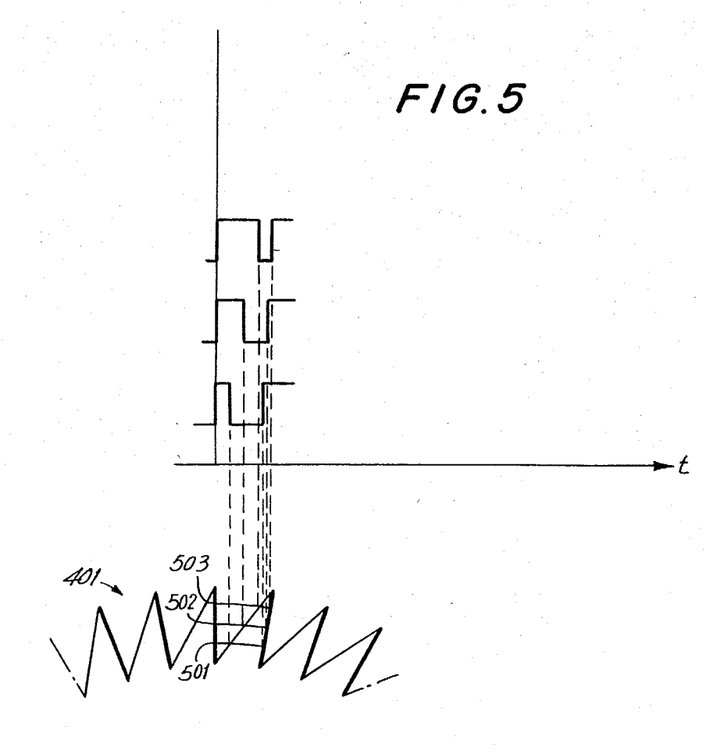
FIG. 5 is a diagram showing various duty cycles corresponding to various radii of incidence.

FIG. 5 shows the same enlarged disc portion 401, with three paths, 501, 502 and 503, projected onto a graph showing the duty cycle for each.

The duty cycles will vary from a minimum value to a maximum value, depending on the minimum and maximum ratios of the widths of the apertures and the nontransmissive portions. In a disc such as disc 205 or disc 206, the minimum duty cycle value can be zero, but with a disc such as 201, the minimum duty cycle value will be greater than zero, depending on the width of arc segment 107.

Figure 6:
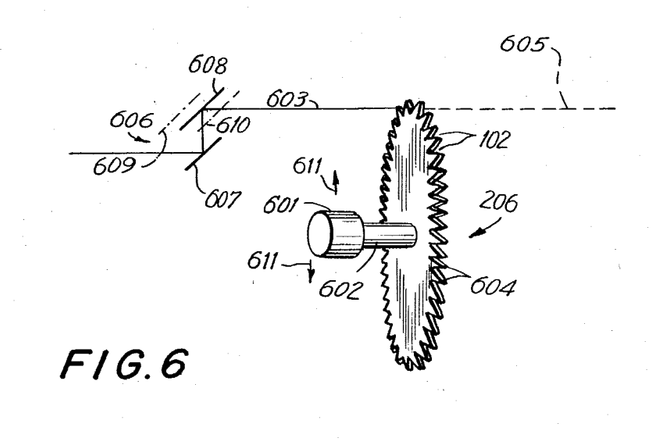
FIG. 6 is a side perspective view of the operation of the invention to produce a single beam.

A preferred embodiment of the apparatus of the present invention for producing a single pulsed beam with a continuously variable duty cyle is shown in FIG. 6. Motor 601 is provided for rotating disc 206 by means of shaft 602, or other mechanical linkage. Laser beam 603 is incident on disc 206 in the annular zone defined by the apertures 102 and the nontransmissive teeth 604 therebetween. As the beam is alternately transmitted and blocked by the apertures and the teeth, pulsed beam 605 emerges. The duty cycle of beam 605 is adjusted by using beam or disc translation means to radially vary the point at which beam 603 impinges on the disc, as described in more detail above.

In one embodiment illustrated, beam translation means 606 comprises a fixed mirror 607 and a moveable mirror 608, both mounted at a 45° angle to the incident beam. By translating mirror 608 with translation means (not shown) horizontally, to positions such as those shown in phantom at 609 and 610, or vertically (to positions not shown), beam 603 can be translated vertically to radially vary its point of incidence on the disc. Suitable compensations and adjustments are then provided for downbeam to ensure that the final focus point at the work station is desirably positioned.

In a more preferred embodiment, which avoids the need for downbeam adjustments, the translation means comprises mechanical means for translating the disc itself. For example, motor 601 could be mounted on a platform (not shown) capable of vertical motion, as represented by arrows 611.

The point of incidence can also be varied by mechanical translation of the laser beam source itself.

For purposes of calibrating the duty cycle using indicia 402, whether the beam or the disc is being moved, motion should preferably be along a line connecting the center of the disc to the beam axis and passing radially through the indicia 402.

Figure 7:
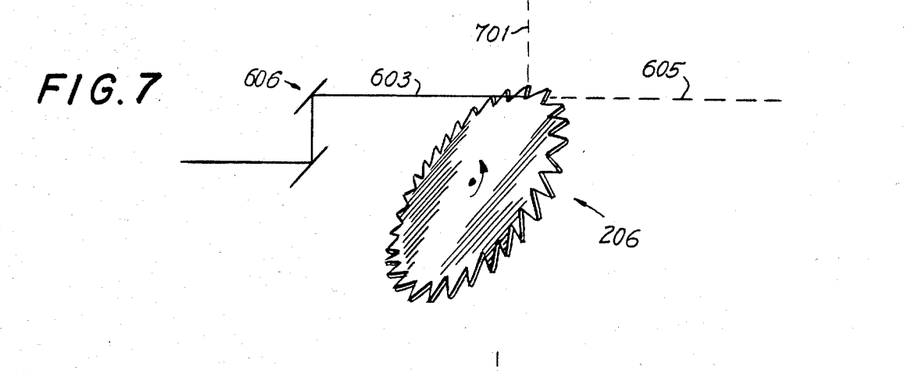
FIG. 7 is a side view of one embodiment of the invention that will produce multiple beams.
Figure 8:
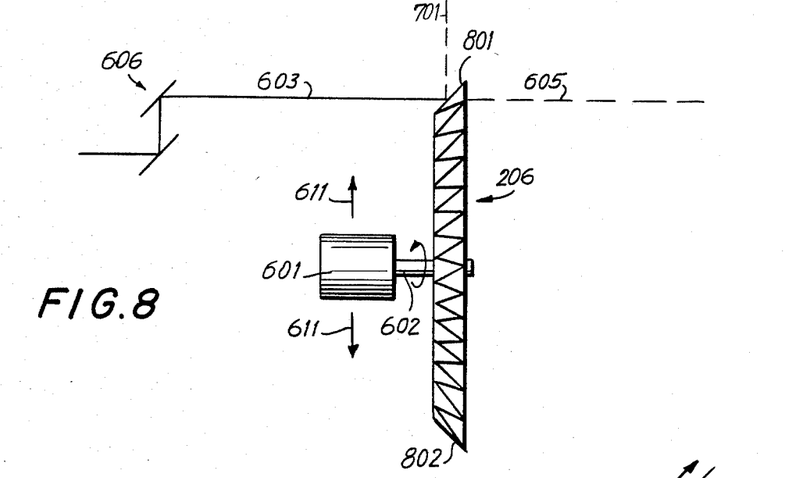
FIG. 8 is a side view of another embodiment of the invention that will produce multiple beams.

The embodiment depicted in FIG. 6 provides all of the advantages of the present invention insofar as adjustment of the duty cycle is concerned. However, the beam energy is wasted during the "off" portion of the cycle. In the embodiments shown in FIGS. 7 and 8, this energy is recovered by making the nontransmissive portions of disc 206 reflective to produce a second pulsed beam 701. The apparatus of FIGS. 7 and 8 is similar to that of FIG. 6, including motor 601 and shaft 602 (not shown in FIG. 7), and beam translation means 606 or disc translation means (represented by arrows 611). The apparatus of these figures differs from that of FIG. 6 only in the aforementioned reflectivity and in the angle at which the disc 206 intercepts the incident beam 603. If disc 206 were made reflective in FIG. 6, the beam would reflect back on itself, which would produce no advantage and introduce possible disadvantages in terms of beam interference and damage to the laser equipment. It is therefore necessary to change the angle at which the reflective surfaces intercept the beam.

In FIG. 7, the entire disc is mounted at an oblique angle with respect to the incident beam 603. The angle shown is 45°, resulting in beam 701 being reflected 90° from its incident direction. In FIG. 8, the mounting of the disc is not changed, but the edges of the disc are beveled, as shown at 801 and 802. The angle of the bevel shown is again 45°, resulting in a 90° reflection of the beam. In both of these embodiments, reflected beam 701 is "on" during the time that transmitted beam 605 is "off," and vice-versa, so that the duty cycle of reflected beam 701 is the complement of that of transmitted beam 605 (i.e., the two duty cycles add to 1).

Figure 9:
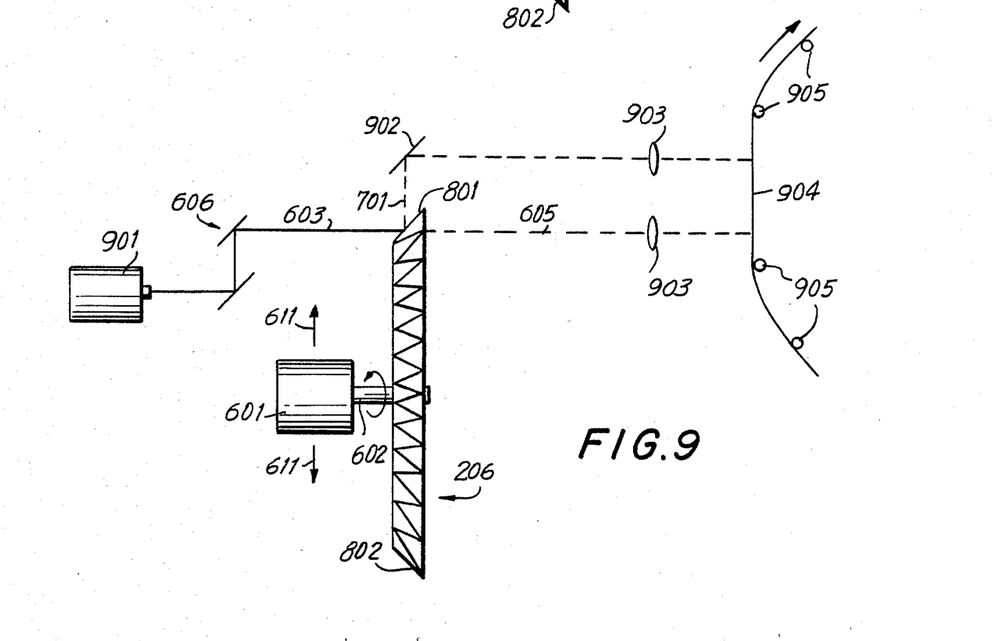
FIG. 9 is a side view of one embodiment of a web perforation system according to the present invention.
Figure 10:
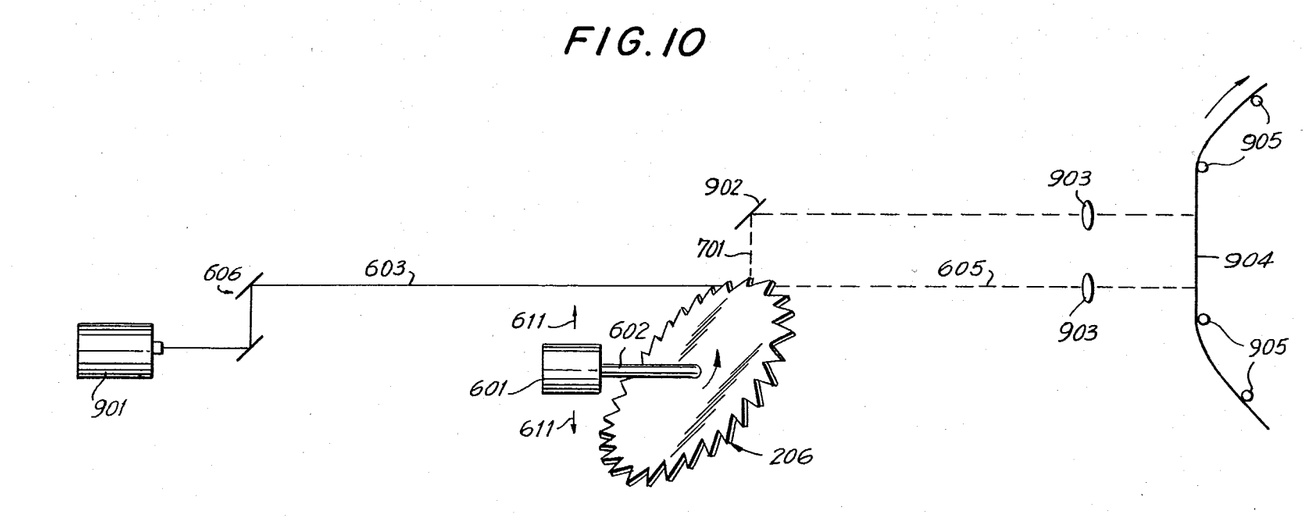
FIG. 10 is a side view of another embodiment of a web perforation system according to the present invention.

In FIG. 9, a web perforation system according to the present invention is shown. The system, as shown, is constructed around the apparatus of FIG. 8. Laser 901 provides incident laser beam 603, which is converted into two pulsed laser beams with adjustable complementarily-related duty cycles. Reflected output beam 701, initially perpendicular to transmitted output beam 605, is reflected by mirror 902, mounted in its path at 45°, to parallel beam 605. A downbeam compensation and adjustment means (not shown) is needed to ensure the positioning of beam 701 regardless of whether beam or disc translation means is used, as either will cause lateral displacement of beam 701. The two beams are focused by lenses 903, or other focusing means, to impinge on a web 904 of cigarette paper or other sheet material, which is being transported by means not shown on rollers 905 in the direction indicated by the arrow, for the purpose of forming rows of perforations in the web. Similarly, FIG. 10 shows a web perforation system according to the present invention which is constructed around the apparatus of FIG. 7. In the system of FIG. 10, a suitable universal joint (not shown) is provided where shaft 602 meets disc 206, so that disc 206 will rotate in the proper plane.

Unless the translation means is adjusted so that both output beams 605 and 701 have half-"on"/half-"off" duty cycles, one beam will have an "on" time which is complementary to that of the other beam, so that the perforations produced by the two beams will not be identical. In some applications, this may be the desired result; for example, it may be required that the size of the perforations in one row be some multiple of the size of those of the other row. This can be accomplished with complementary duty cycles. However, if identical holes are required, but 1:2/1:2 duty cycles are not possible for any reason, further adjustment of the duty cycle of one beam, with additional chopper apparatus according to this invention, may be necessary.

Thus, a simple efficient apparatus for converting a continuous incident laser beam into a pulsed beam with adjustable duty cycle, for perforation of a web or other applications has been disclosed. Those skilled in the art will recognize that the inventive principles disclosed herein can be practiced with apparatus other than that specifically described above.

I claim:

1. Apparatus for converting a continuous incident laser beam into a pulsed laser beam wherein the duty cycle is substantially continuously variable between a minimum value and a maximum value, comprising:

a disc of nontransmissive material, said disc being rotatable about its axis and having a plurality of apertures disposed within an annular zone thereon, the ratio of the width of said apertures to the width of the adjacent nontransmissive portions of said disc between said apertures varying substantially continuously with the disc radius from a minimum ratio to a maximum ratio, said continuous beam being incident on said disc within said annular zone;

means for rotating said disc such that said continuous incident beam impinges alternately on sequential ones of said apertures, to be transmitted by said apertures, and on said nontransmissive disc portions, to create a first pulsed beam; and means for translating said disc and said incident beam relative to one another to permit variation of the point of incidence of said continuous beam radially of the disc within said annular zone, to vary the duty cycle of the first pulsed beam.

2. The apparatus of claim 1, wherein said translating means operate to translate the source of said incident beam.

3. The apparatus of claim 1, wherein said translating means operate to translate said disc.

4. The apparatus of claim 1, wherein said translating means operate to translate said incident beam.

5. The apparatus of claim 1, wherein said nontransmissive portions of said disc are reflective and lie in the plane of said disc, said incident beam intersecting the plane of said disc at an oblique angle thereto, such that a second pulsed beam is produced by reflection of said continuous beam therefrom, said reflected second pulsed beam having a duty cycle which is the complement of the duty cycle of said transmitted first pulsed beam.

6. The apparatus of claim 1, wherein a nontransmissive portion of said disc is provided with markings representing the duty cycles corresponding to selected ones of said radially variable points of incidence.

7. A system for perforating a web of sheet material with a pulsed laser beam, comprising:

a continuous laser beam source;

an optical stage for converting the continuous beam from said source into a pulsed beam wherein the duty cycle is substantially continuously variable between a minimum value and a maximum value for varying the size and spacing of the perforations produced in said web, comprising:

a disc of nontransmissive material, said disc being rotatable about its axis and having a plurality of apertures disposed within an annular zone thereon, the ratio of the width of said apertures to the width of the adjacent nontransmissive portions of said disc between said apertures varying substantially continuously with the disc radius from a minimum ratio to a maximum ratio, said continuous beam being incident on said disc within said annular zone, means for rotating said disc such that said continuous incident beam impinges alternately on sequential ones of said apertures, to be transmitted by said apertures, and said nontransmissive disc portions, to create a first pulsed beam, and means for translating said disc and said incident beam relative to one another to permit variation of the point of incidence of said continuous beam radially of the disc within said annular zone, to vary the duty cycle of the first pulsed beam;

means for transporting a web of sheet material such that said pulsed beam impinges thereon for perforation of the web; and focusing means in the path of said pulsed beam for focusing said beam on said web.

8. The system of claim 7, wherein said translating means operate to translate said laser beam source.

9. The system of claim 7, wherein said translating means operate to translate said disc.

10. The system of claim 7, wherein said translating means operate to translate said incident beam.

11. The system of claim 7, wherein said nontransmissive portions of said disc are reflective and lie in the plane of said disc, said incident beam intersecting the plane of said disc at an oblique angle thereto, such that a second pulsed beam is produced by reflection of said continuous beam therefrom, said reflected second pulsed beam having a duty cycle which is the complement of the duty cycle of said transmitted first pulsed beam, said system further comprising means for directing said reflected second pulsed beam toward said web.

12. The system of claim 7, wherein a nontransmissive portion of said disc is provided with markings representing the duty cycles corresponding to selected ones of said radially variable points of incidence.

* * * * *